United States Patent [19]

Everett

[11] Patent Number: 4,611,692

[45] Date of Patent: Sep. 16, 1986

[54] BICYCLE BRAKE ASSEMBLY

[76] Inventor: Richard C. Everett, P.O. Box 1304, Lake Grove, Oreg. 97034

[21] Appl. No.: 678,966

[22] Filed: Dec. 6, 1984

[51] Int. Cl.⁴ .............................................. F16D 65/00
[52] U.S. Cl. ................................ 188/73.1; 188/250 B; 403/408.1
[58] Field of Search ................. 188/73.1, 24.11, 24.12, 188/217, 251 A, 250 B, 242, 250 G, 234, 248, 255, 256, 258; 403/87, 90, 408; 411/537, 538

[56] References Cited

U.S. PATENT DOCUMENTS

| 787,092 | 4/1905 | Gallagher | 188/250 B |
| 939,477 | 11/1909 | Cote | 411/537 X |
| 3,986,585 | 10/1976 | Toplis et al. | 188/73.1 |
| 4,051,924 | 10/1977 | Yoshigai | 188/24.12 |
| 4,441,592 | 4/1984 | Everett | 188/264 A |

FOREIGN PATENT DOCUMENTS 326361 5/1903 France .............................. 188/24.12

Primary Examiner—George E. A. Halvosa
Assistant Examiner—M. C. Graham
Attorney, Agent, or Firm—Edward E. Roberts

[57] ABSTRACT

A bicycle brake assembly including a brake shoe member having a molded metallic backbone member formed as a framework of elongate generally rectangular form with a structurally reinforced portion having an aperture therethrough for receiving a stud member therein. The reinforced portion is provided with a concave surface surrounding the aperture, with friction pad brake shoe material molded about the backbone to form a brake shoe member. A washer having a matingly configured convex surface coacts with the concave surface during assembly to the arm to provide for adjustment.

9 Claims, 7 Drawing Figures

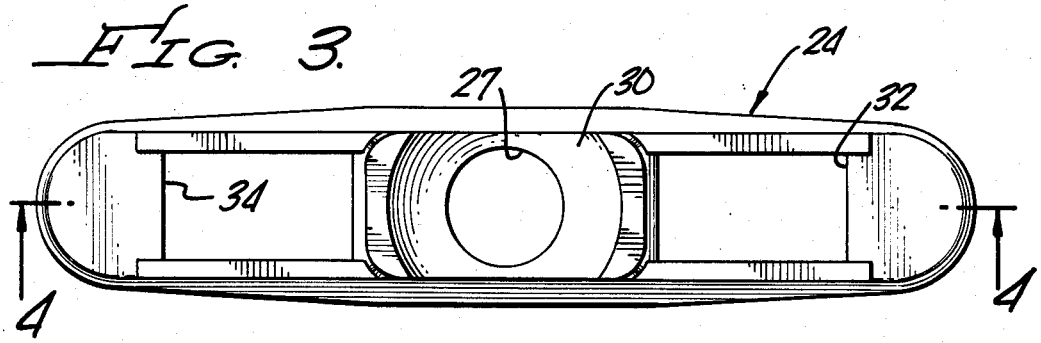
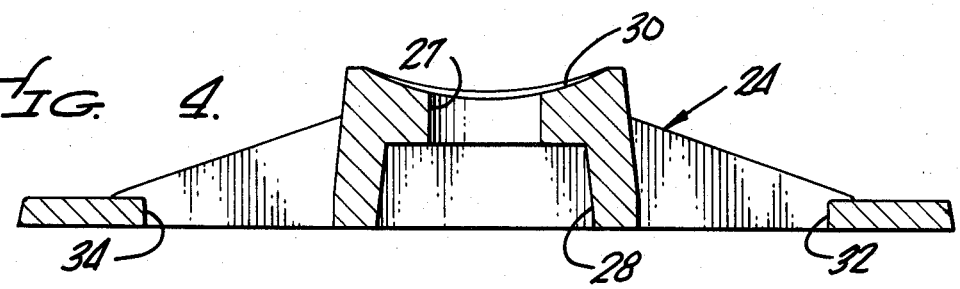
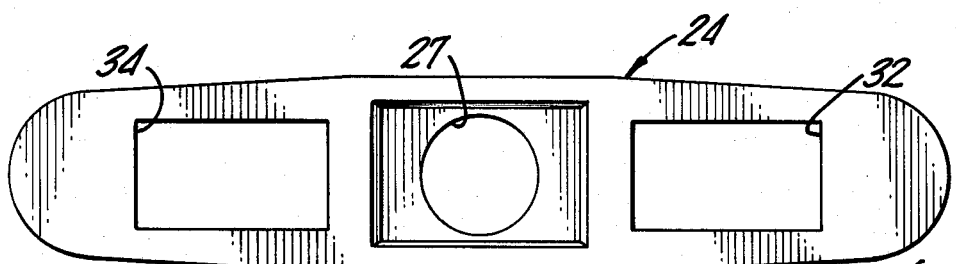
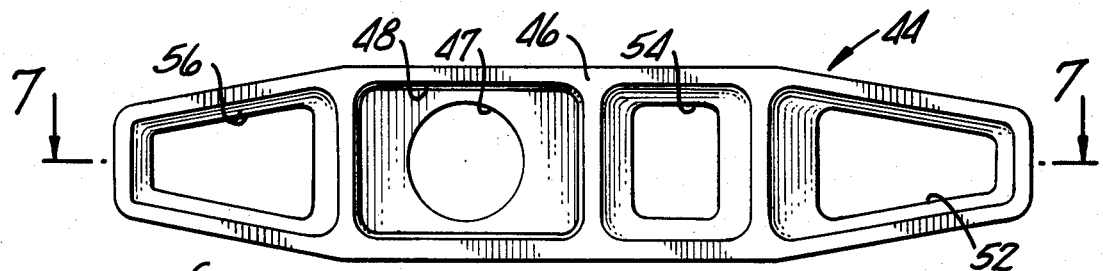
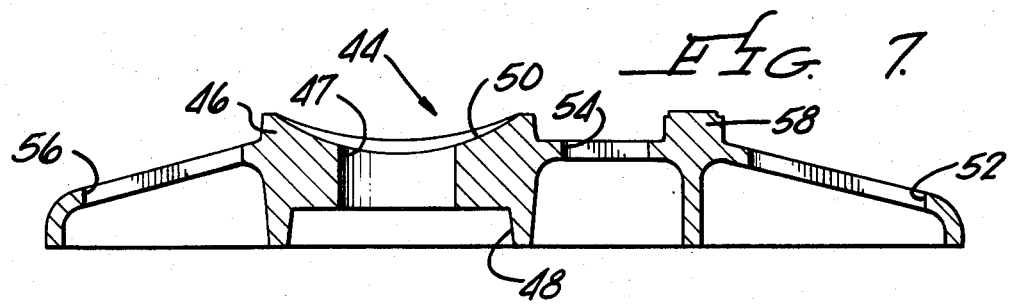

BICYCLE BRAKE ASSEMBLY

BACKGROUND OF THE INVENTION

The background of the invention will be discussed in two parts.

1. Field of the Invention

This invention relates to bicycle brake assemblies, and more particularly to a bicycle brake assembly with a ball and socket arrangement and replaceable brake shoes.

2. Description of the Prior Art

Bicycle brake shoe assemblies with replaceable brake shoes have taken various forms and designs. In lightweight bicycles, the brake assembly is mounted to the fork or frame, and is provided with brake shoes adapted to engage the rim of the wheel, such brake assemblies being referred to as caliper brakes.

Such assemblies have pivotally secured, manually actuated brake arms in depending relation to the rim with the ends thereof being slotted or having enlarged openings for receiving therein a stud for adjustably securing thereto a brake shoe member. In brake shoes of this type, the shoe includes a pad of friction material in generally rectangular form bonded to, or molded about a stud or fastener which is then passed through the slotted end of the caliper arm for securing thereto. Other known brake shoes have a sheet metal housing bent or crimped for receiving a block or pad of friction material.

One such device is shown and described in U.S. Pat. No. 4,051,924, entitled "Device for Mounting Brake Shoe of Brake for Bicycle", issued Oct. 4, 1977 to Yoshigai, such device including a bent sheet metal housing for retention of the brake shoe, with ball and socket means at the point of interconnection of the brake shoe to the brake arm for permitting adjustment upon assembly. The embodiment of FIG. 5 of this patent is the closest prior art of which applicant is aware.

Another bicycle brake assembly is shown and described in Applicant's U.S. Pat. No. 4,441,592, issued Apr. 10, 1984, entitled "Bicycle Brake Assembly". In that patent the brake assembly includes a separable heat sink member having a concave surface surrounding the aperture thereof, with a convex washer member coacting therewith to provide a ball and socket means for adjustable mounting of the brake assembly to the caliper arm.

U.S. Pat. No. 4,444,294, entitled "Brake Shoe Mount for Brake Apparatus" shows and describes other alternatives for adjustably mounting the brake shoe member to the arm, such other arrangements also including a concave edge about the aperture through the brake arm for receiving therein an adjustment member having a convex surface with an eccentric aperture through the adjustment member for enabling an additional axis of adjustment of the assembly.

Such prior art devices are illustrative of the state of the art of adjustable brake shoe assemblies using a ball and socket arrangement at the point of interconnection of the brake shoe member to the caliper brake arm.

It is an object of the present invention to provide a new and improved bicycle brake assembly.

It is another object of the present invention to provide a new and improved brake shoe member for a bicycle brake assembly.

It is a further object of the present invention to provide a new and improved brake shoe member for a bicycle brake assembly having a ball and socket arrangement for connection to the brake arm.

SUMMARY OF THE INVENTION

The foregoing and other objects of the invention are accomplished by providing a brake shoe member having a molded metallic backbone member formed as a framework of elongate generally rectangular form with a structurally reinforced portion having an aperture therethrough for receiving a stud member therein. The reinforced portion is provided with a concave surface surrounding the aperture, with friction pad brake shoe material molded about the backbone to form a brake shoe member. A washer having a matingly configured convex surface coacts with the concave surface during assembly to the arm to provide for adjustment.

Other objects, features and advantages will become apparent from a reading of the specification when taken in conjunction with the drawings, in which like reference numerals refer to like elements in the several views.

BRIEF DESCRIPTION OF THE DRAWINGS

FIG. 3 is a top plan view of the backbone member used in the brake shoe member of the assembly of FIG. 1;

FIG. 4 is a cross-sectional view of the backbone member of FIG. 3 as viewed generally along line 4—4 thereof;

FIG. 5 is a bottom plan view of the backbone member of FIG. 3;

FIG. 6 is a top plan view of an alternate embodiment of the backbone member of FIG. 3; and FIG. 7 is a cross-sectional view of the backbone member of FIG. 6 as viewed generally along line 7—7 thereof.

DESCRIPTION OF THE PREFERRED EMBODIMENT

Figure 1:
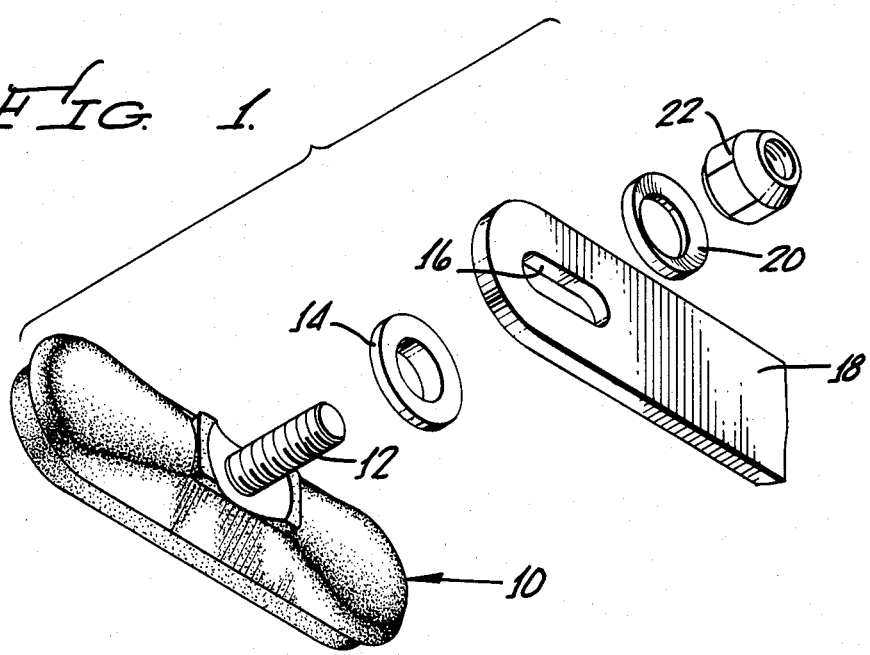
FIG. 1 is an exploded perspective view of the components of the bicycle brake assembly according to the invention.

Referring now to the drawings, and particularly to FIG. 1, there is shown an exploded perspective view of the brake assembly according to the invention, the assembly including a brake shoe member, generally designated 10, with the shaft of a stud portion 12 thereof configured for receiving thereon a first convex washer member 14 for coacting with the brake shoe member 10. The shaft of the stud portion 12 is then passed through the opening 16 of the brake arm 18, only a portion of which is shown. A second concave washer member 20 is provided with a planar surface for abutting the opposite side of the brake arm 18 with a nut member 22 having a convex coacting surface for engagement therewith.

Figure 2:
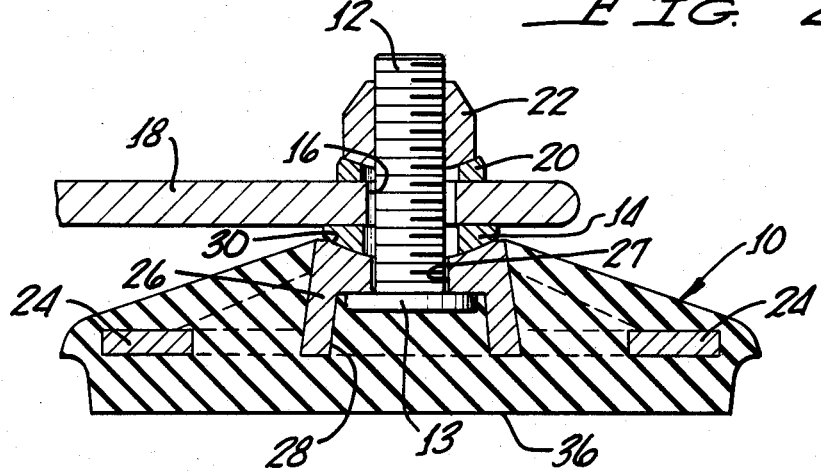
FIG. 2 is an enlarged cross-sectional view of the bicycle brake assembly of FIG. 1.

Referring now to FIG. 2, there is shown a cross-sectional view of the assembled brake assembly of FIG. 1 with the brake shoe member 10 including a molded metallic backbone member 24 (see also FIGS. 3 through 5) of an open frameworked, generally rectangular configuration, the backbone 24 having a structurally reinforced portion 26 at the approximate midpoint thereof. The portion 26, includes an aperture 27 therethrough, and on the undersurface thereof is provided with an elongate rectangular cavity 28 configured for captive retention therein of the matingly configured head 13 of the stud 12 which is passed through the aperture 27.

The opposite side of portion 26 is provided with a concave surface 30 for matingly coacting with the adjacent convex surface of the convex washer member 14 to provide a ball and socket arrangement for adjusting the brake assembly relative to the brake arm 18 for adjusting the friction pad surface of the shoe member 10 relative to the rim (not shown). With the shaft portion of the stud 12 passed through the aperture 16 of the caliper arm 18, the concave washer 20 is then assembled on the stud 12 with the planar surface thereof in abutting relation with the arm 18, the assembly then being secured with the lock nut 22, suitably provided with a convex surface for engaging the concave surface of the washer 20.

In the instant invention, the friction pad includes the molding of suitable friction material about the framework of the backbone 24, substantially surrounding the backbone 24 as depicted in FIG. 2. To promote adhesion of the friction material to the backbone 24, by referring to FIGS. 3 through 5, it can be seen that the backbone member 24 is a generally open framework of elongate generally rectangular configuration with openings 32 and 34 extending therethrough. With the stud member 12 positioned with the head 13 thereof within the cavity 28, when the friction material is molded thereon to form the brake shoe, the material flows around the backbone member 24 and through the openings 32 and 34 to provide a cohesive brake shoe member 10. The lower edges of the backbone member 24 lie in a common plane, and as can be seen in FIG. 2, the length of the backbone member 24 extends beyond the surface 36 of the brake shoe pad thus providing support for the friction material when the surface 36 engages the rim of the bicycle, thereby avoiding separation of the friction material from the metallic portion of the backbone 24 under the force of braking. Furthermore, with the friction material molded substantially about the backbone 24, intimate thermal relationships are achieved between the friction material and the metal of the backbone 24 for promoting the dissipation of heat from the material itself through the backbone 24 material, and thence through the head 13 of the stud member 12 to the surrounding air.

In contrast to this, the prior art, such as that shown in the aforementioned Yoshigai patent No. 4,051,924, utilizes a brake shoe in which a sheet metal housing is bent or crimped about a block of friction material. In such prior art brake shoes, separation of the block of friction material from the bent or crimped sheet metal is not uncommon, particularly under the force of braking. FIG. 5 of this patent illustrates a ball and socket arrangement, in which the area about the aperture in the sheet metal is formed as a concave edge for coaction with a the convex surface of a bowl-like washer. However, as in the other illustrated embodiments, the brake shoe assembly is formed with a block of friction material secured to a bent or crimped sheet metal, unlike the instant invention in which the friction material is molded to substantially surround the backbone 24, thereby providing a more reliable, more economical brake shoe.

FIGS. 6 and 7 depict an alternative embodiment of a backbone 44 in which the reinforced portion 46 is offset from the midpoint of the backbone 44, with a stud-receiving aperture 47 extending therethrough, with a rectangular cavity 48 formed on the undersurface thereof. The surface opposite the cavity 48 is a concave surface 50. Openings 52, 54 and 56 are formed in the framework for passage therethrough of the friction material during molding. To assist in molding and to assist in providing structural strength, at a point intermediate openings 52 and 54, the backbone 44 is provided with an upwardly extending nub 58, the upper surface of which is generally coplanar with the upper surface of the reinforced portion 46. This nub 58 provides lateral as well as longitudinal support for the friction material molded on the backbone 44 thereby assisting in avoiding separation of the friction material from the backbone 44. In addition, after molding, the upper surface of the nub 58 is exposed to the atmosphere, thereby assisting in the promotion of heat dissipation.

With a brake shoe utilizing the offset reinforced portion 46 of the backbone 44, wear of the friction material at the point of contact with the rim becomes more uniform thus minimizing squealing of the brake shoe during braking.

In addition, in both embodiments, with the concave surface of the ball and socket arrangement formed directly in the backbone of the brake shoe member during molding, a subsequent machining operation is eliminated, or alternatively, an additional part is eliminated, thus rendering the brake shoe assembly of the instant invention more reliable and more economical.

While there has been shown and described a preferred embodiment, it is to be understood that various adaptations and modifications may be made without departing from the spirit and scope of the invention. For instance, stud 12 may be formed integral with backbone 24 and not as a separate part. Further, backbone 24 need not include a reinforced portion nor necessarily be an open framework with openings extending therethrough.

I claim:

1. In a bicycle brake assembly for attachment to a caliper brake arm of a bicycle, the combination comprising:
    a brake shoe member including a backbone member formed of a metallic material in a generally elongate, generally rectangular framework having openings therein and edge portions defining a common plane, said backbone member having a reinforced portion generally intermediate the ends of said backbone member on the side opposite said common plane with a concave surface from which protrudes a stud member having a shaft thereof extending from the backbone member;
    friction material molded about and substantially surrounding said backbone member and extending through said openings with said concave surface exposed and with a friction brake shoe surface generally parallel to said common plane; and
    washer means for mounting on said shaft having a convex surface for matingly coacting with said concave surface of said backbone member for enabling adjustment of said brake shoe member relative to the caliper arm of the brake assembly with said shaft passed through an opening in the brake arm.

2. The combination according to claim 1 wherein said stud member is generally midway between the ends of said backbone member.

3. The combination according to claim 1 wherein said stud member is generally offset from the midpoint of said backbone member.

4. The combination according to claim 1 wherein said stud member protrudes through an aperture in said concave surface of said backbone member, the opposite surface of said backbone member having means for at least partially retaining the head of said stud member.

5. The combination of claim 1 further including:
   second washer means for mounting on said shaft on the other side of said caliper arm from said washer means, said second washer means having a planar surface in abutting relation with said caliper arm, and an opposite surface which is concave; and
   a lock nut provided with a convex surface for engaging the concave surface of said second washer to thereby secure the bicycle brake assembly.

6. The combination according to claim 1 wherein said brake shoe member has a generally elongate surface of friction material and said backbone member is at least as long as said surface.

7. In a bicycle brake assembly for attachment to a caliper brake arm of a bicycle, the combination comprising:
   a brake shoe member including a backbone member formed as a unitary member of a metallic material in a generally elongate, generally rectangular framework having openings therethrough with a reinforced portion intermediate the ends thereof and an aperture extending through said reinforced portion, one surface of said reinforced portion having a concave surface about said aperture and the opposite surface having means for at least partially retaining the head of a stud member having a shaft thereof extending through said aperture;
   friction material molded about and substantially surrounding said backbone member and extending through said openings with said concave surface exposed and with a friction brake shoe surface, said backbone member having a length at least equal to the length of said brake shoe surface; and
   washer means having a convex surface for matingly coacting with said concave surface of said backbone member with said washer means on the shaft of said stud member for enabling adjustment of said brake shoe member relative to the caliper arm of the brake assembly with the shaft passed through an opening in the brake arm.

8. The combination according to claim 7 wherein said reinforced portion is generally midway between the ends of said backbone member.

9. The combination according to claim 7 wherein said reinforced portion is generally offset from the mid point of said backbone member.

* * * * *